United States Patent [19]
Sadre-Marandi

[11] Patent Number: 5,214,461
[45] Date of Patent: May 25, 1993

[54] TWO AND FOUR PICTURE MODE CAMERA

[75] Inventor: Ehsan Sadre-Marandi, Chattanooga, Tenn.

[73] Assignee: Beattie Systems, Inc., Cleveland, Tenn.

[21] Appl. No.: 764,882

[22] Filed: Sep. 24, 1991

[51] Int. Cl.⁵ .............................................. G03B 41/00
[52] U.S. Cl. ..................................... 354/118; 354/123
[58] Field of Search .............. 354/111, 112, 113, 114, 354/118, 120, 123

[56]  References Cited
U.S. PATENT DOCUMENTS 1,893,668  1/1933  Diaz ..................................... 354/111
3,760,702  9/1973  Seiden .................................. 354/118

FOREIGN PATENT DOCUMENTS 17989 of 0907  United Kingdom ................ 354/123

Primary Examiner—Michael L. Gellner
Assistant Examiner—Nicholas J. Tuccillo
Attorney, Agent, or Firm—Alan Ruderman

[57] ABSTRACT

A camera for producing either two or four separate photographic images selectively on a single sheet of film has a fixed wall for dividing the exposable area of the film into two equal areas and a pair of movable walls acting in combination with the fixed wall for dividing the film into four equal areas. The movable walls are pivotably mounted and move from the two picture mode to the four picture mode merely by rotation of the camera from a vertical disposition to a horizontal disposition and vice versa. The camera includes a pair of lenses controlled to move in accordance with the disposition of the camera so that in the two picture mode the lenses are disposed with the center of each lens aligned with the center of each half of the exposable area of the film, and when in the four picture mode the lenses relocate and are disposed with the center of each lens aligned with the center of each one quarter of the exposable area of the film, first with one pair of such areas and then with the other pair. Turning the camera to the two picture mode and taking only one photograph and then turning to the four picture mode and taking two pictures, or vice versa, may permit the taking of three separate photographic images.

11 Claims, 2 Drawing Sheets

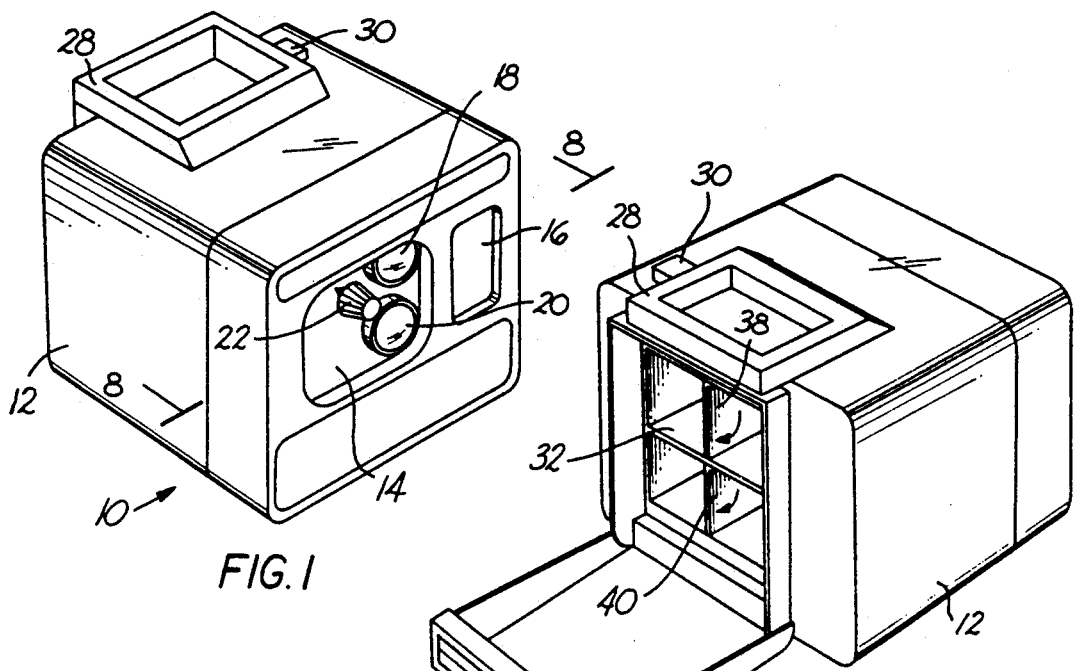
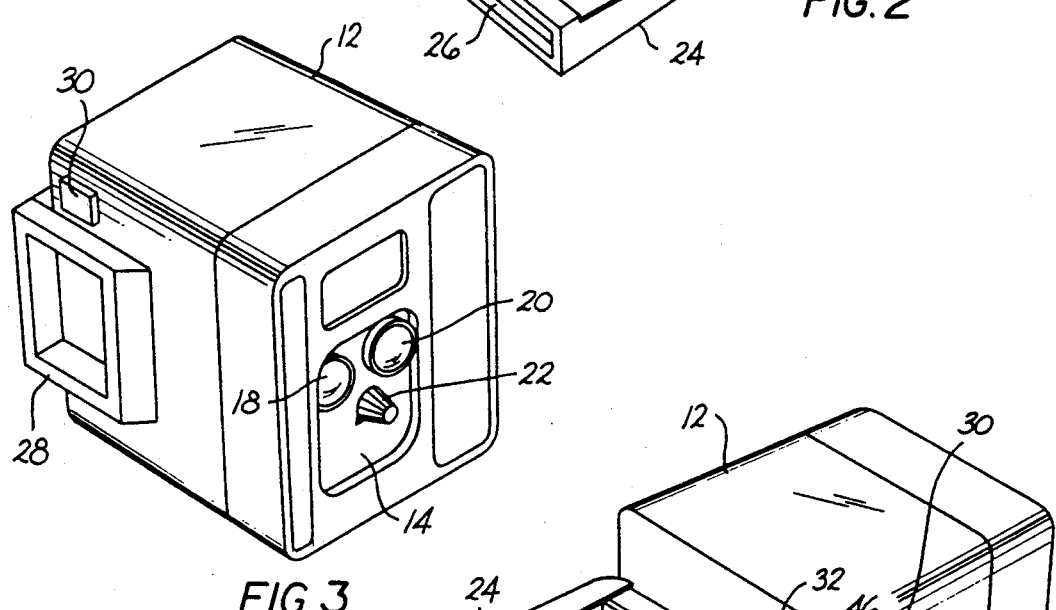
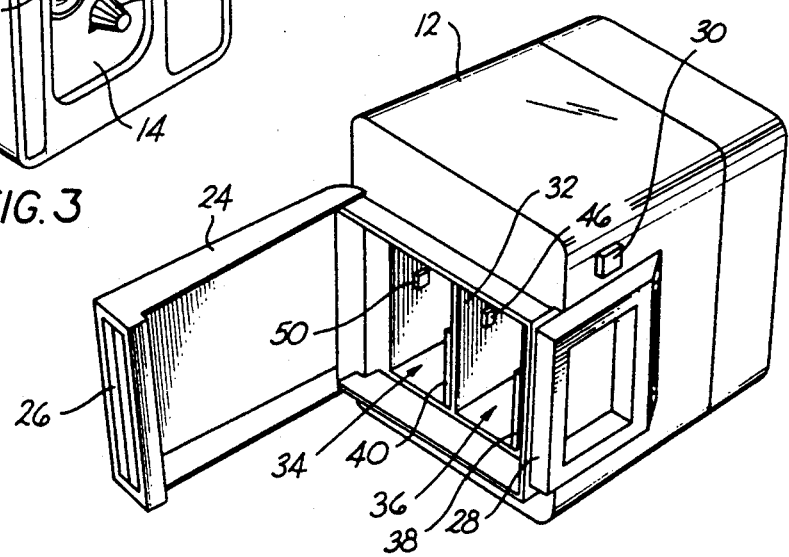

TWO AND FOUR PICTURE MODE CAMERA

BACKGROUND OF THE INVENTION

This invention relates to cameras and more particularly to a camera permitting a single sheet of film to record either two images or four images selectively, i.e., a camera having means for dividing a sheet of film into two or four equal areas and having lenses movable to center the images properly on each area of the film so that a single sheet of film may produce either two pictures or four pictures selectively.

Various size photographs for use in identification cards, passports and similar different size photos are abound in the art. Many of these use conventional size instant film such as produced by Polaroid Company which have a sheet of film including a sensitive or exposable film area which is 3.75×2.85 inches. It is desirable that certain of these photos be half that size, i.e., 2.85×1.87 inches while it is desirable that others be one quarter of that size, i.e., 1.87×1.42 inches. Certain prior art cameras have the capability of producing either two photographs of the half size variety using two lenses, while other prior art cameras have the capability of producing four photographs of the one quarter size variety using four lenses. Thus, if a camera user has the need for or requires photographs of both the half size and quarter size variety, two different cameras must be purchased.

SUMMARY OF THE INVENTION

Consequently, it is a primary object of the present invention to provide a camera which can photograph on a single sheet of film either two photographic images or four photographic images selectively.

It is another object of the present invention to provide a single camera which can divide the exposable film surface into either two equal areas or four equal areas selectively and produce a separate photographic image on each area of the film selectively.

It is a further object of the present invention to provide a camera having two lenses for producing either two separate photographic images or four separate photographic images on the exposable surface of a single sheet of camera film selectively, the size of the photographic image of each image produced in the four photograph mode being half that of the two photograph mode.

Accordingly, the present invention provides a camera having wall means for dividing the exposable area of the film into either two equal areas for a two picture mode or four equal areas for a four picture mode selectively, the selection of the mode being controlled by rotating the camera from a vertical disposition to a horizontal disposition. The camera incorporates lens means which is controlled to move in accordance with the disposition of the camera so that two pictures may be produced on one sheet of film in the two picture mode or four pictures may be produced on one sheet of film in the four picture mode.

In the preferred mode of the invention the wall means comprises a fixed wall for dividing the film into two equal areas and a pair of movable walls acting in combination with the fixed wall for dividing the film into four equal areas, the walls acting to prevent the images from overlapping so that two or four separate images may be formed on the film. When the camera is in a first disposition, i.e., the two picture mode, the movable walls are parallel to and spaced from or superposed against the fixed wall to divide the film into two equal areas, and when in the second disposition, i.e., the four picture mode approximately 90° to the first disposition, the movable walls move to divide the two equal areas into equal halves, i.e., so that there are four equal areas.

In the preferred mode the lens means comprises two lenses. In the two picture mode the lenses are disposed with the center of each lens aligned with the center of each half of the exposable area on the film and the fixed wall prevents the images from overlapping. When in the four picture mode the lenses relocate and are disposed with the center of each lens aligned with the center of one quarter of the exposable area on the film, being first aligned with the center of one pair of such areas and the then with the center of the other pair of such areas, the fixed wall and the movable walls in each instance preventing the images from overlapping. In the two picture mode two individual or two identical pictures may be produced on one sheet of film, while in the four picture mode either four individual pictures or two pair of identical pictures or two individual pictures and one pair of identical pictures may be produced on one sheet of film.

In the specific form of the invention the movable walls are pivotably hinged so as to pivotably rotate to divide the film area of the two picture mode in half so as to provide four equal areas for the four picture mode, the movable walls pivoting by the action of gravity as the disposition of the camera is changed so that in the horizontal disposition the movable walls are in one position, e.g. the two picture mode, and in the vertical disposition the walls are in the second position, e.g. the four picture mode.

BRIEF DESCRIPTION OF THE DRAWINGS

The particular features and advantages of the invention as well as other objects will become apparent from the following description taken in connection with the accompanying drawings in which:

FIG. 1 is a front perspective view of a camera constructed in accordance with the principles of the present invention illustrated in the vertical disposition;

FIG. 2 is a rear perspective view of the camera illustrated in FIG. 1 with the camera back in the open position so as to illustrate the disposition of the dividing walls in the four picture mode;

FIG. 3 is a view similar to FIG. 1 illustrating the camera in the horizontal mode;

FIG. 4 is a view similar to FIG. 2 both the camera rotated to the horizontal disposition so that the dividing walls are in the two picture mode;

DESCRIPTION OF THE PREFERRED EMBODIMENT

Figure 8:
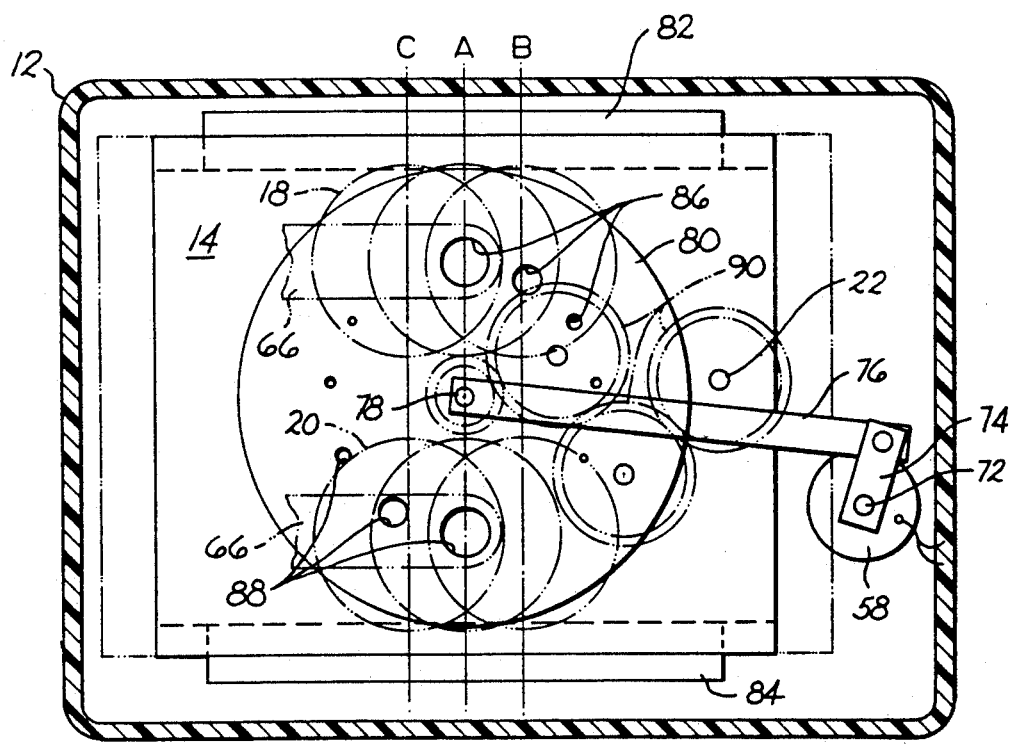
FIG. 8 is a cross sectional view taken substantially along line 8—8 of FIG. 1 illustrating the mechanism for moving the lenses.

Referring to the drawings a camera 10 constructed in accordance with the best mode of the present invention has a housing or body 12 including a lensboard 14 slidably mounted at the front as hereinafter described together with an adjacent flash 16. A pair of side-by-side lenses 18, 20 are fastened to the lens board 14 which also carries an iris adjustment knob 22 for varying the f-stop. At the rear of the camera body is a back plate 24 into which is slidably inserted instant positive film 26 such as that manufactured and sold by Polaroid Company, the film being in sheet form. The back plate 24 is pivotably connected to the body of the camera to open the rear of the camera, a latch 28 being positioned to lock the back plate in the closed position for positioning the film for exposure when shutter means 66 in FIG. 8 is actuated by a shutter release button 30.

Figure 6:
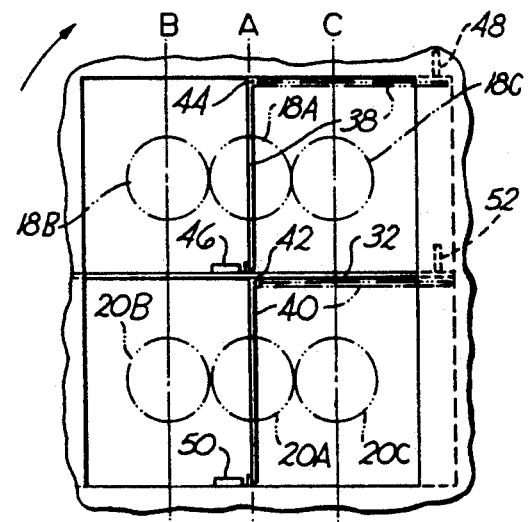
FIG. 6 is an enlarged fragmentary elevational view of the rear of the camera illustrating the disposition of the movable divider walls in both the two picture and four picture modes and the disposition of the lenses in the different modes.

To provide both a two photograph mode and a four photograph mode selectively on a single sheet of film, the present invention provides wall means in the form of a single fixed wall 32 extending across the body 12 of the camera so as to divide the exposable area of the film in half and to create two equal volumetric sectors 34, 36 at the rear of the camera body as illustrated in FIG. 4, together with a pair of movable walls 38 and 40 for dividing each half volumetric sector 34, 36 of the camera body again in half so as to form four equal volumetric quadrants at the rear of the camera body and thereby divide the exposable area of the film into four equal areas. The fixed wall 32, which defines a plane extending intermediate the lenses 18, 20, is constructed by assembling a pair of rectangular cross sectional hollow parallelpiped boxes together with one wall of each abutting to form the fixed wall 32. Each movable wall 38 and 40 is pivotably hinged relative to the fixed wall 32 as illustrated in FIG. 6, one wall 40 being pivotably journalled on a pin 42 substantially at the center of one of the abutting walls of one parallelpiped, i.e., the center of the fixed wall 32 and the other wall 38 being pivotably journalled on a pin 44 on a wall of the other parallelpiped spaced from the fixed wall. The pins 42, 44, as can be readily seen, are thus substantially parallel to the fixed wall 32 and provide axes about which the movable walls pivot.

When the camera is in a first disposition, e.g. the vertical dispositions such as illustrated in FIGS. 1 and 2, the fixed wall 32 is substantially horizontally disposed and the walls 38 and 40 are disposed by the action of gravity in the vertical position to form the four picture mode. When the camera is turned or rotated in the direction indicated by the clockwise arrow in FIG. 6 so as to be substantially 90° thereto, e.g. the horizontal position as illustrated in FIGS. 3 and 4 so that the fixed wall is disposed vertically, the movable walls due to gravity pivot to the vertical disposition and align against the wall on which they are pivoted, i.e., the wall 40 is superposed against the fixed wall 32 while the wall 38 is superposed against the spaced wall on which it is hinged as illustrated by the phantom position in FIG. 6. Preferably a pair of small magnets 46, 48 and 50, 52 hold each wall 38, 40 at each of the two positions, each wall 38 and 40 being constructed from ferrous material at least at the end remote from the respective pivot pin 44, 42. The magnets are desirable because the camera in operation may not be held perfectly level in either the vertical or horizontal position. The strength of the magnet is such that the walls 38 and 40 begin to drop when the camera is rotated approximately 15° to 20° in either direction from the position illustrated in FIGS. 1 and 2 to the position illustrated in FIGS. 3 and 4.

Figure 5:
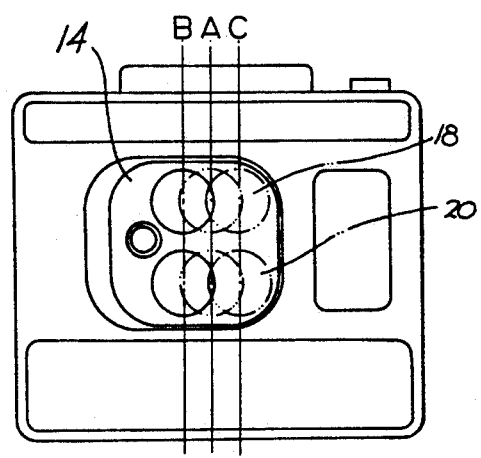
FIG. 5 is a front elevational view of the camera illustrating the different lens positions for the two picture mode and the four picture mode.

As hereinafter described in detail the lensboard 14 is movable and is controllably moved to center each lens 18, 20 properly. Thus, each lens is in the center of each half of the exposable area of the film when the camera is in the two photograph mode, and in the center of two of the quadrants of the exposable area of the film when the camera is in the four photograph mode. One lens is always on one side of the fixed wall 32 while the other lens is always on the other side of the fixed wall 32, but the lenses may move laterally with the lensboard 14 relative to the wall 32. Thus, as illustrated in FIGS. 5 and 6, in the two photograph mode, the center of the lenses 18, 20 are adjusted to be at the center of the parallelpipeds, i.e., along line A, and on opposite sides of the fixed wall 32. When the camera is rotated to the four photograph mode and the walls 38 and 40 pivot to divide the exposable film area into four segments, the center of each lens 18, 20 will relocate to be aligned along line B with the center of one quarter of the exposable area and then subsequently will realign along line C so that the center of each lens is aligned with the center of the remaining quarters of the film area.

Figure 7:
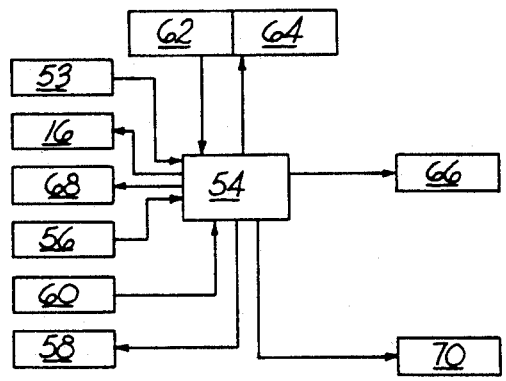
FIG. 7 is a block diagram of the control system for controlling the position of the lenses.

Although such movement of the lensboard to locate the lenses for the different photographs may be performed by manually sliding the lensboard, it is preferred that such movement h=automatically performed. To this end, as illustrated in FIG. 7 in block form, the camera includes a control system including a power supply 53 and a controller 54 which preferably is a microprocessor that receives camera position input data from a tilt switch 56 and determines the proper location of the lenses. This information is relayed from the controller 54 to a motor 58 to drive the lensboard as hereinafter described, three opto-interrupters spaced apart at equal intervals on the lensboard acting to feed lensboard position signals 60 to the controller to stop the motor when the lensboard and thus the lenses are in the correct position. In the four photograph mode the lensboard is shifted to the "home" position so that the lenses 18, 20 are aligned along line B. After the second picture is taken the lensboard is driven to align the lenses along line C. After the fourth picture is taken the lensboard moves back to the home position. In the two photograph mode the lensboard is driven to the center position with the lenses aligned along line A and stays in that position. A control panel 62 supplies the information as to the number of pictures taken to the controller 54 and a control indicator 64 indicates the various functions and information to the user. The controller also receives information from and controls the internal flash 16 and controls shutters 66 corresponding to each lens, and may also control an external flash 68 and an aiming light 70.

As illustrated in FIG. 8, the shaft 72 of the motor 58 is fastened to and drives a crank arm 74, the crank arm 74 being journally connected to one end of a lever 76. The other end of the lever 76 is connected through a pin 78 extending through a circular iris 80, the pin being connected to the lensboard 14. The lensboard includes lateral slots extending substantially parallel to the fixed wall 32 for receiving lateral slide rails 82, 84 which are fixed to the body 12 of the camera and guide the lensboard. Thus, rotation of the motor 58 drives the lensboard 14 and the iris laterally, the lenses of course being mounted on and movable with the lensboard. The iris 80 include pairs of an equal number of various size apertures such as 86, 88 which may be selected by rotation of the knob 22 to rotate gears 90 and position an equivalent pair of selected apertures behind each lens so that both lenses are adjusted to the same f-stop.

Accordingly, the present invention provides a camera which may produce selectively either two separate photographic images or four separate photographic images on the exposable surface of the single sheet of camera film by utilizing a fixed wall together with a pair of movable walls. Merely by rotating the camera from a horizontal or vertical position and vise versa selects the mode and positions the lenses properly for producing either two pictures or four pictures. It is also contemplated by the present invention to utilize the two lens system to produce either the two separate photographic images or other separate photographic images more than two by utilizing the one or more movable walls. For example, if only one movable wall 38 or 40 were utilized rather than both walls, then three separate photographs may be produced. If three walls were used, two of which divide the volume 34 into three equal parts and one such as wall 38 which divides the volume 36 in half, then five separate photographs may be produced. Thus, the number of separate photographs that may be produced depends on the number of movable walls used to divide the volumes 34 and 36. The number of photographs in an additional photographic mode beyond the two photograph mode is therefore equal to the number of movable doors used to divide the volumes 34 and 36 plus two. However, from a practical standpoint, the four photograph mode is the ideal for use together with the two photograph mode when utilizing conventional size instant film.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed is:

1. A camera for photographing either two or more separate images selectively on a single sheet of film, said camera comprising a housing, a fixed wall mounted in said housing for dividing said housing into a pair of sectors and defining a plane, first and second lenses, lens mounting means for mounting said lenses in said housing in spaced apart disposition on opposite sides of said plane, means for mounting said lens mounting means for movement linearly relative to said housing in a direction substantially parallel to said plane, film supporting means mounted on said housing for carrying a sheet of film spaced from said lenses at a location for receiving photographic images focused by said lenses, at least one movable wall, means for mounting said movable wall for moving from a first position to a second position in response to rotation of said camera from a disposition wherein said plane is substantially vertical to a disposition wherein said plane is substantially horizontal, said movable wall in said first position being substantially parallel to said plane and unobstructing to images focused by said lenses onto said film and said movable wall in said second position being substantially normal to said plane and dividing one of said sectors into smaller sectors, means for moving said lens mounting means to position each lens selectively in the center of a sector when said movable wall is in either the first or second position, and a shutter corresponding to each lens for exposing a sheet of film carried by said film supporting means to an image focused by a respective lens selectively.

2. A camera as recited in claim 1, wherein said movable wall is journally mounted in said housing for pivoting between said first and second positions.

3. A camera as recited in claim 1, wherein there are a pair of movable walls, each movable wall being disposed in said second position for dividing each sector substantially in half so that either two, three or four images may be photographed selectively.

4. A camera as recited in claim 3, wherein each movable wall is journally mounted in said housing, one of said movable walls being journalled on said fixed wall.

5. A camera as recited in claim 3, wherein each lens is selectively positioned in the center cf a respective sector of said pair when said movable wall is disposed in said first position, and each lens is selectively positioned in the center of a first pair of respective half sectors and then in the center of a second pair of respective half sectors.

6. A camera as recited in claim 1, wherein said movable wall is journalled for rotation about an axis parallel to said plane and movable between said first and second positions when said axis is disposed substantially horizontally and said housing is rotated relative to said axis.

7. A camera as recited in claim 6, wherein said lens mounting means comprises a lensboard slidably mounted in said housing, and said means for moving said lens mounting means comprises control means responsive to the disposition of said housing relative to said axis.

8. A camera as recited in claim 7, wherein there are a pair of movable walls, each movable wall being disposed in said second position for dividing each sector substantially in half so that either two, three or four images may be photographed selectively.

9. A camera as recited in claim 8, wherein each movable wall is journally mounted in said housing, one of said movable walls being journalled on said fixed wall.

10. A camera as recited in claim 6, including magnetic means for holding said movable wall in each of said first and second positions until said housing has been rotated substantially relative to said axis.

11. A method for producing either two or more separate photographic images selectively on a single sheet of film spaced from a pair of lenses mounted in a camera housing, said method comprising disposing a fixed planar wall in said housing intermediate said lenses and extending to adjacent said film to divide said housing into a pair of sectors, disposing at least one movable wall in said housing for dividing at least one of said sectors into substantially two smaller sectors upon rotation of said camera housing from a first position wherein said fixed wall is substantially vertical to a second position about a substantially horizontal axis selectively to provide said pair of sectors or more than said pair of sectors, moving said lenses parallel to said fixed wall to position each lens selectively in the center of a desired sector and in the center of a desired smaller sector, and exposing said film to an image focused by each lens selectively when each lens is positioned in the center of each desired sector and smaller sector.

\* \* \* \* \*

UNITED STATES PATENT AND TRADEMARK OFFICE
CERTIFICATE OF CORRECTION

PATENT NO. : 5,214,461
DATED : May 25, 1993
INVENTOR(S) : Ehsan Sadre-Marandi

It is certified that error appears in the above-indentified patent and that said Letters Patent is hereby corrected as shown below:

Column 6, line 60, after "position" please insert
- - wherein said fixed wall is substantially horizontal, rotating said housing from said first position to said second position - -

Signed and Sealed this

Fourteenth Day of December, 1993

Attest:

BRUCE LEHMAN

*Attesting Officer*    *Commissioner of Patents and Trademarks*